(12) United States Patent
Koerten

(10) Patent No.: US 10,548,388 B2
(45) Date of Patent: Feb. 4, 2020

(54) HAIR CUTTING PRACTICE APPARATUS

(71) Applicant: Ben Koerten, Tower Lakes, IL (US)

(72) Inventor: Ben Koerten, Tower Lakes, IL (US)

(*) Notice: Subject to any disclaimer, the term of this patent is extended or adjusted under 35 U.S.C. 154(b) by 789 days.

(21) Appl. No.: 14/884,922

(22) Filed: Oct. 16, 2015

(65) Prior Publication Data
US 2017/0110024 A1  Apr. 20, 2017

(51) Int. Cl.
*A45D 44/14* (2006.01)
*G09B 19/24* (2006.01)
*G09B 19/00* (2006.01)

(52) U.S. Cl.
CPC ........... *A45D 44/14* (2013.01); *G09B 19/003* (2013.01); *G09B 19/24* (2013.01)

(58) Field of Classification Search
CPC ....... A45D 44/14; G09B 19/003; G09B 19/24
USPC .......................................................... 434/94
See application file for complete search history.

(56) References Cited

U.S. PATENT DOCUMENTS

| | | | | |
|---|---|---|---|---|
| 397,986 A * | 2/1889 | Johnson | ................ | A41H 5/01 223/68 |
| 872,133 A | 11/1907 | Kinney | | |
| 1,280,429 A * | 10/1918 | Engle | ................ | A41H 5/01 223/68 |
| 2,948,445 A * | 8/1960 | Stoddard | ................ | A41H 5/01 223/68 |
| 4,383,374 A | 5/1983 | Bertero | | |
| 4,768,528 A | 9/1988 | Steele, Jr. | | |
| 4,810,196 A | 3/1989 | Walker | | |
| 4,867,184 A | 9/1989 | Davis | | |
| 5,156,365 A * | 10/1992 | McCaig | ................ | A45D 44/14 248/160 |
| 7,073,517 B1 | 7/2006 | Burnette, III | | |
| 7,331,353 B2 | 2/2008 | Harvie | | |
| 7,410,358 B2 | 8/2008 | Morehead | | |
| 8,397,734 B2 | 3/2013 | Manella | | |
| 8,893,729 B2 | 11/2014 | Mennella | | |
| 2006/0078870 A1 | 4/2006 | Yu | | |
| 2007/0108828 A1* | 5/2007 | Brink | ................ | A47C 7/62 297/391 |
| 2007/0238388 A1 | 10/2007 | Morehead | | |
| 2007/0269772 A1 | 11/2007 | Taya | | |
| 2010/0205712 A1* | 8/2010 | Bish | ................ | A45D 44/08 2/50 |
| 2010/0210171 A1* | 8/2010 | Chan | ................ | A63H 9/00 446/98 |
| 2013/0280688 A1 | 10/2013 | Pagana-Lausch | | |
| 2015/0118654 A1 | 4/2015 | Phillips | | |

* cited by examiner

*Primary Examiner* — Sean K. Hunter
*Assistant Examiner* — Jennifer L Korb
(74) *Attorney, Agent, or Firm* — Lesavich High-Tech Law Group, S.C.; Stephen Lesavich

(57) ABSTRACT

A practice hair cutting apparatus. The apparatus in its expanded configuration allows a human mannequin head to be attached and simulates a size and shape of a shoulder portion and/or should and back portion of an actual human subject. The apparatus in its contracted position is easily transportable in a student backpack. The apparatus is attachable to and removable from a variety of chairs, tables, walls and other free-standing objects such as tripods. The apparatus is used for hair cutting students who desire to practice hair cutting skills inside and outside a classroom.

21 Claims, 15 Drawing Sheets

HAIR CUTTING PRACTICE APPARATUS

FIELD OF INVENTION

This invention relates to teaching and practicing hair cutting techniques. More specifically it relates to an apparatus for practicing hair cutting.

BACKGROUND OF THE INVENTION

Students who desire to be barbers or beauticians practice hair cutting skills on plastic or rubber mannequin heads with human or artificial hair. The mannequin heads are used in the classroom for practice. Many classrooms have specialized classroom equipment for mounting the mannequin heads. Typical barber or styling chairs known in the art include a set of standard size chairs with hydraulic or other types of pumps that are adjustable up and down, recline and can spin from side-to-side or all the way around.

To develop hair cutting skills, students often desire to practice their hair cutting skills on their mannequin heads outside the classroom setting. However, it is very difficult to effectively mount the mannequin head outside the classroom setting. Many hair cutting students try to place or mount for example with clamps, their mannequin head directly on a table or shelf or ledge which is not the proper height and allows the mannequin head to move during hair cutting.

In addition, a mannequin head used by itself does not provide adequate training for hair cutting students because the mannequin head does not include a shoulder portion of a human subject. The shoulder portion is important to practice hair cutting skills for people who have shoulder length or longer hair.

Thus, it is desirable to allow hair cutting students to have an adequate practice apparatus to develop hair cutting skills for both inside and outside a classroom setting.

SUMMARY OF THE INVENTION

In accordance with preferred embodiments of the present invention, some of the problems associated with practicing hair cutting are overcome. A practice hair cutting apparatus is presented.

The apparatus in its expanded configuration allows a human mannequin head to be attached and simulates a size and shape of a shoulder portion and/or should and/or shoulder and back portion of an actual human subject. The apparatus in its contracted position is easily transportable in a student backpack. The apparatus is attachable to and removable from a variety of chairs, couches, tables, walls and other free-standing objects such as tripods. The apparatus is used for hair cutting students who desire to practice hair cutting skills inside and outside a classroom.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein.

DETAILED DESCRIPTION OF PREFERRED EMBODIMENTS OF THE INVENTION

In most states, barbers and other hair cutters are required to take many hours of classwork to develop their skills. For example in the State of Illinois, barber students are required to complete 1500 of classroom training. The classroom hours vary from state-to-state. In most barber and/or hair cutting schools, plastic or rubber mannequin heads with real human and/or artificial hair are used to practice hair cutting skills inside a classroom.

Typical barber or styling chairs known in the art include a set of standard size hair cutting chairs with hydraulic or other types of pumps that are adjustable up and down, recline and can spin from side-to-side or all the way around. For example, many standard size barber/beauty chairs have a chair backs that are about 15-20 inches in width and 15-20 inches in height have a thickness of about three to six inches of padded materials for sitting comfort.

It is also desirable for barber and other hair cutting students to practice their hair cutting skills outside a classroom setting (e.g., at their home location). However, it is very difficult to mount and secure mannequin heads outside a classroom setting. As a result the mannequin head is often at the wrong height, may move while the hair is being cut and does not properly simulate cutting hair of an actual human subject because the mannequin head does not include a shoulder portion of a human subject.

Figure 1:
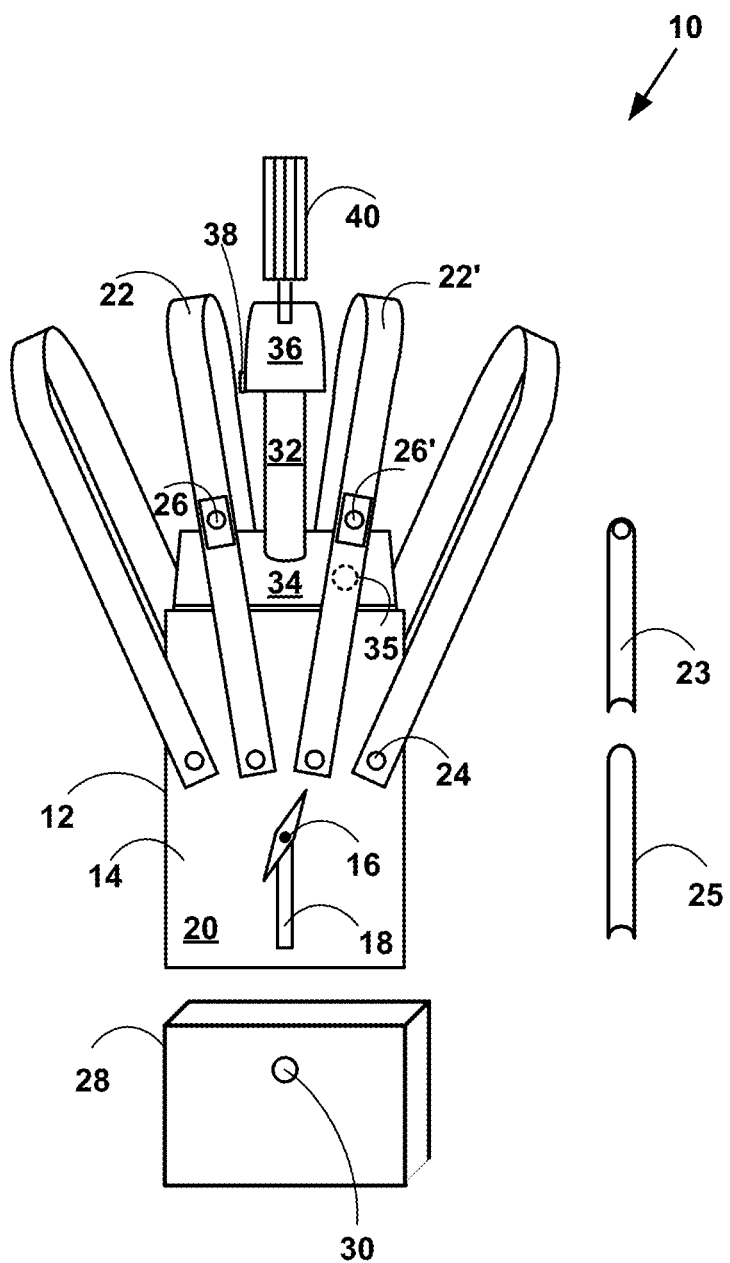
FIG. 1 is a block diagram illustrating a front view of an exemplary hair cutting practice apparatus.

FIG. 1 is a block diagram 10 illustrating a front view of an exemplary hair cutting practice apparatus 12 (not drawn to scale).

The apparatus 12 includes a rigid base portion 14 (hereinafter after, base portion 14). The base portion 14 comprises an adjustable material which expands when an outward pressure is applied and contracts when the pressure is removed. Thus, the base portion 14 can be pushed onto a back portion of a chair and remain firmly in place during use.

In a preferred embodiment, the base portion 14 is specifically sized and shaped to fit standard hair cutting chairs used in a barber shop and/beauty shop and/or salon, etc. However, the present invention is not limited to such an embodiment and other sizes and types of chairs can be used to practice the invention.

In a preferred embodiment, the base portion 14 includes one or more pressure screws 16 for applying pressure to the base portion 14 to attach to a barber chair, beauty shop chair, other chair, and/or a free-standing object such as a chair, couch, wall, table, etc. The one or more pressure screws 16 are adjustable and movable in an adjustment component track 18 within a front body surface 20 (and back body surface 44 of FIG. 3) of the base portion 14. However, the invention can also be practiced either with and/or without the one or more pressure screws 16.

The base portion 14 includes plural adjustable, flat inverted u-shaped movable tabs 22 that move towards and away from each other on the base portion 14. Only four movable tabs are illustrated for simplicity. However, the invention is not limited to four movable tabs and more and/or fewer movable tabs can be used to practice the invention. The present invention is also not limited to inverted u-shaped movable tabs 22 and other shapes can be used to practice the invention.

The plural movable tabs 22 illustrated in FIG. 1 are in an expanded and/or open position. In such an expanded and/or open position, the plural movable tabs 22 simulate plural different approximate shoulder configurations (e.g., size, shape, width etc.) of an average human subject. The plural movable tabs provide a hair cutting student with a very accurate platform for practicing hair cutting inside and outside the classroom.

In a preferred embodiment, the plural movable tabs 22 in an expanded and/or open position include an exemplary shoulder end-to-end length adjustable from about 15 inches to about 21 inches to simulate plural different average sized human shoulders and a width of about 8 inches to about 11 inches to simulate plural different average thicknesses of a should portion of an average human body. However, the present invention is not limited to these exemplary measurements and other measurements can be used to practice the invention.

The plural movable tabs 22 are attached to the base component 14 with an attachment means 24, including, but not limited to, a rivet, screw, bolt, pin, etc. However, the present invention is not limited to such an embodiment and other attachment means 24 can be used to practice the invention. The plural movable tabs 22 move to the right and to the left and/or side to side about the attachment means 24.

A width of the plural movable tabs 22 are also adjustable by compressing and/or expanding individual tabs of the plural movable tabs 22. This allows the apparatus 12 to simulate plural different widths of a shoulder portion the average human subject.

In a preferred embodiment, the plural movable tabs 22 are flat tabs with a width of about one inch (e.g., about 2.54 centimeters, etc.) and a thickness of about 0.39 inches (e.g., about 1 millimeter, etc.). However the present invention is not limited to these measurements and other measurements can also be used to practice the invention. The present invention is also not limited to flat movable tabs 22.

Selected ones of the movable tabs 22, 22' include one or more magnets 26, 26' (two of which are illustrated for simplicity). The magnets 26, 26' are used to attach a cutting cloth (e.g., 56, FIG. 4, etc.) and hold it securely in position over the plural movable tabs 22, 22' when the tabs 22 are in the expanded and/or open configuration. This simulates a cutting cloth placed over the shoulders of the average human subject. The cutting cloth 56 protects the human subject from falling hair when it is cut from the head. The cutting cloth 56 is also used to provide a cover for the movable tabs 22 which provide a skeleton structure to simulate the human shoulders.

FIG. 1 illustrates the plural movable tabs 22 as flat tabs 22. In another preferred embodiment, the plural movable tabs 22 are replaced with plural movable hollow and/or solid tubes 23 (e.g., plastic tubes, metal tubes, rubber tubes, composite material tubes, etc.). In yet another preferred embodiment, the plural movable tabs 22 are replaced with plural movable solid bendable rods 25 (e.g., plastic rods, metal rods, rubber rods, composite material rods, etc.). However, the present invention is not limited to such an embodiment and other embodiments can be used to practice the invention and the invention can be practice without and/or without plural movable tubes 23 and/or rods 25 (FIG. 1).

The plural movable tabs 22, tubes 23 and/or rods are adjustable allowing a width of a simulated shoulder portion of the average human subject to expanded and contracted to simulate a range of shoulder portion from thin to thicker average human subjects.

The base portion 14 further includes a removable base portion 28 specifically sized, shaped and configured for fitting inside and being selectively removable from and re-insertable into the base portion 14.

The removable base portion 28 is used to allow the apparatus 12 to be used on a variety of different chairs and other free standing stands such as tripods (e.g., 80, etc.), and objects such as walls, couches tables, desks, counters, etc. The removable base portion 28 includes a second attachment adjustment component 30 for accepting and engaging one end of the one or more pressure screws 16 to keep the removable base portion 28 in place.

Figure 13:
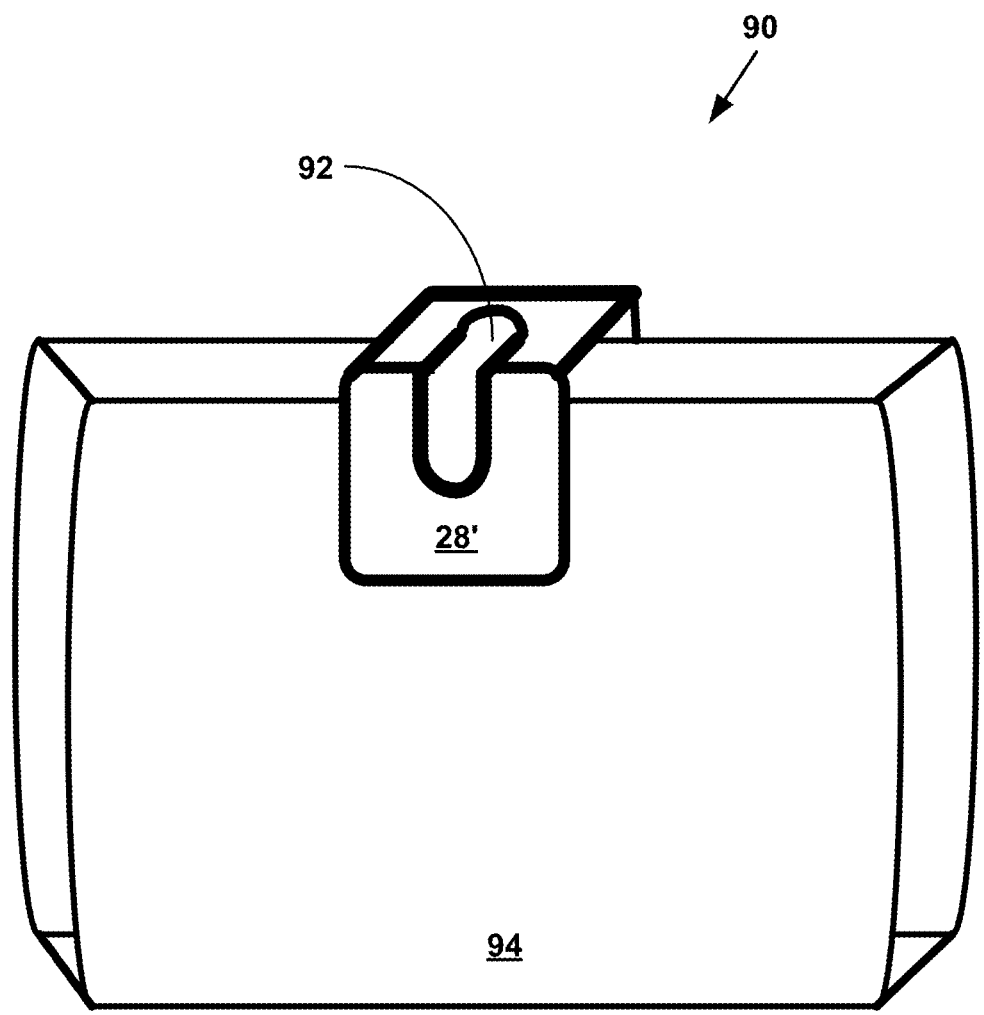
FIG. 13 is a block diagram illustrating a front view of the exemplary hair cutting practice apparatus of FIG. 1 with another exemplary removable base portion attached to a chair back.

FIG. 13 illustrates another embodiment of the removable base portion 28. An another removable base portion 28' further includes a receiving track 92 for attaching the apparatus 12 to a free standing stand such as a tripod 80, single free standing leg 81, etc. However, the present invention is not limited to this embodiment and the present invention can be practiced with and/or without another removable base portion 28'.

The base portion 14 includes a mannequin head mounting component 32 attached to a top surface 34 of the base portion 14. The top surface 34 includes a base connection component 35 to connect the apparatus 12 to a free-standing stand such as a tripod (e.g., 80, FIG. 9, FIG. 15), etc. or other type of device and/or stationary objects such as a wall, counter, table, etc. The mannequin head mounting component 32 is connected to and includes an angular movable component 36 with an adjustment screw 38.

The angular movable component 36 moves a mannequin tab component 40 to various angles from about zero to about 180 degrees in all directions along a top surface of a spherical portion 45 of the angular movable component 36 to allow simulating various angles of the human subject with their head tipped forward or to the side to cut hair. The angular movable component 36 is connected to a mannequin tab component 40 that engages and is inserted into an engaging component on a mannequin head (e.g., 54, FIG. 4, 66, FIG. 6, etc.).

Figure 3:
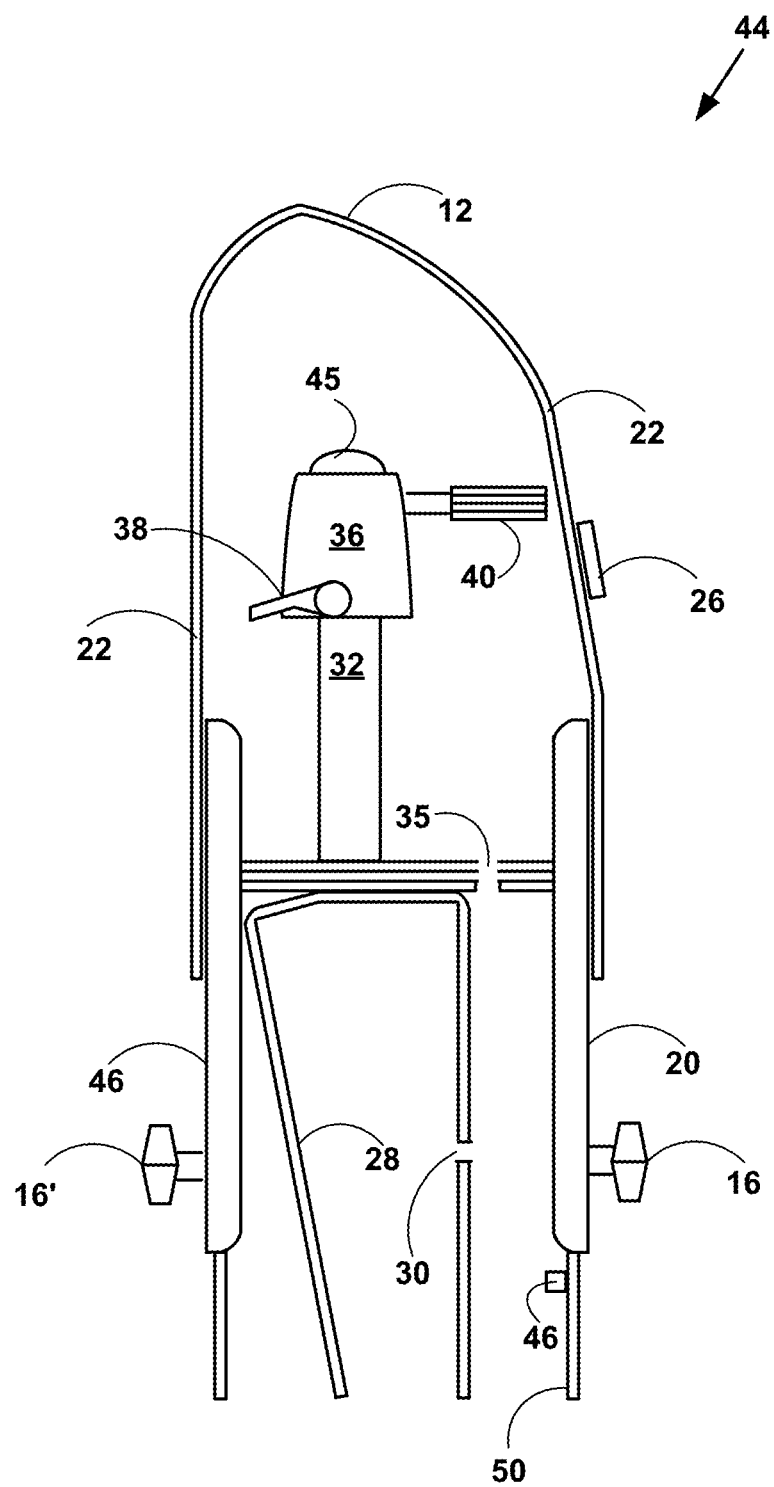
FIG. 3 is a block diagram illustrating a side view of the exemplary hair cutting apparatus of FIGS. 1 and 2.
Figure 12:
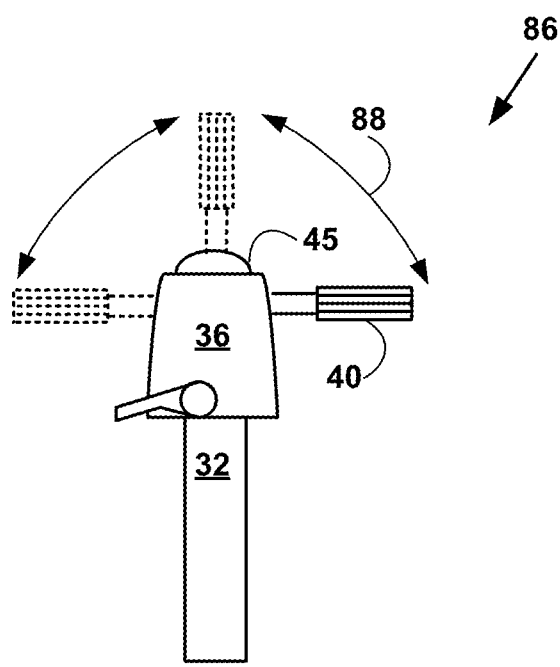
FIG. 12 is a block diagram illustrating a side view of various movement angles of a angular movement component of the exemplary hair cutting practice apparatus of FIG. 1.

FIG. 1 illustrates the mannequin tab component 40 at a 90 degree position and FIG. 3 illustrates the mannequin tab component 40 at a zero and/or 180 degree position as adjusted by the angular movable component 36 and locked into place by the adjustment screw 38. FIG. 12 illustrates various other movement angles of the angular movable component 36.

In a preferred embodiment, the mannequin head mounting component 32 and/or the mannequin tab component 40 includes a metal (e.g., aluminum, steel, stainless steel, copper, etc.), plastic, rubber and/or composite material component. The mannequin head mounting component 32 and/or the mannequin tab component 40 may also be injection molded, extruded, pultruded, pull-winded and/or manufactured and/or produced with other techniques.

In a preferred embodiment, the mannequin tab component 40 is a component with plural attachment ridges and valleys, specifically sized and shaped to engage a standard size hole in a bottom portion of mannequin heads 54, 66, 79 with actual human or artificial hair for teaching hair cutting that are used to provide barber and beauty shop students a teaching platform to practice cutting and styling hair. Such mannequin head 54, 66, 79 are known in the art. However, the present invention is not limited to this embodiment and other configurations, sizes and shapes may be used to practice the invention.

The mannequin head mounting component 32 and the angular movable component 36 used with the removable base portion 28 allow the apparatus 12 to be used on chairs, walls, ledges, counters and/or other free standing objects since a human mannequin head can be rotated to various angles with the angular movable component 36.

However, the apparatus 12 is not limited to the components described and more, fewer and/or other components can be used to practice the invention.

In a preferred embodiment, the base portion 14 and/or removable base portion 28 and/or plural movable tabs 22 includes wood, plastic, rubber, metal, composite and/or other materials.

In a preferred embodiment, the base portion 14 and/or removable base portion 28 and/or plural movable tabs 22 include Polyetherimide, Polyimide, other thermosetting polyimides, other plastics and/or composite materials.

In another preferred embodiment, the base portion 14, the removable base portion 28 and the plural movable tabs 22 comprise Polyvinyl chloride (PVC) polyethylene and/or polypropylene.

However, the present invention is not limited to these materials and other materials can be used for the base portion 14 and/or removable base portion 28 and/or plural movable tabs 22 to practice the invention.

"Polyetherimide" (PEI) is an amorphous, amber-to-transparent thermoplastic with characteristics similar to the related plastic PEEK. Polyether ether ketone (PEEK) is a colorless organic polymer thermoplastic Relative to PEEK, PEI is cheaper, but less temperature-resistant and lower in impact strength.

For example, commercially, ULTEM is a family of PEI products manufactured by SABIC. ULTEM resins are used due to their heat resistance, solvent resistance and flame resistance.

"Polyimide" (PI) is a polymer of imide monomers. Such imide monomers include pyromellitic dianhydride and 4,4'-oxydianiline and others. Polyimide materials are lightweight, flexible, resistant to heat and chemicals. Polyimide parts are not affected by commonly used solvents and oils, including hydrocarbons, esters, ethers, alcohols and freons. They also resist weak acids.

"Thermosetting polyimides" are known for thermal stability, good chemical resistance, excellent mechanical properties. Normal operating temperatures for such polymides range from cryogenic with temperatures below about $-238°$ F. ($-150°$ C.) to those exceeding about $500°$ F. ($260°$ C.).

In a preferred embodiment, the base portion 14 and/or removable base portion 28 and/or plural movable tabs 22 include aluminum, steel, stainless steel, iron, copper, and/or other metals. However, the present invention is not limited to these materials and other materials can be used to practice the invention.

"Composite materials" are engineered or naturally occurring materials made from two or more constituent materials with significantly different physical or chemical properties which remain separate and distinct at the macroscopic or microscopic scale within the finished structure. Common polymer-based composite materials, include at least two parts, a substrate (e.g., fibers, etc.) and a resin.

The composite materials include "Fiber-reinforced polymers" (FRP) including thermoplastic composites, short fiber thermoplastics, long fiber thermoplastics or long fiber-reinforced thermoplastics. There are numerous thermoset composites, but advanced systems usually incorporate aramid fiber and carbon fiber in an epoxy resin matrix. The composite materials also include carbon/carbon composite materials with carbon fibers and a silicon carbide matrix.

The base portion 14 and/or removable base portion 28 and/or plural movable tabs 22 may also be injection molded, extruded, pultruded, pull-winded and/or manufactured and/or produced with other techniques. However, the present invention is not limited to such an embodiment and more, fewer or other types of materials and/or other techniques can be used to practice the invention.

"Extrusion" is a manufacturing process where a material is pushed through a die to create long objects of a fixed cross-section. Hollow sections are usually extruded by placing a pin or mandrel in the die. Extrusion may be continuous (e.g., producing indefinitely long material) or semi-continuous (e.g., repeatedly producing many shorter pieces). Some extruded materials are hot drawn and others may be cold drawn.

Feedstock for extrusion may be forced through the die by various methods: by an auger, which can be single or twin screw, powered by an electric motor; by a ram, driven by hydraulic pressure, oil pressure or in other specialized processes such as rollers inside a perforated drum for the production of many simultaneous streams of material.

"Pultrusion" is a continuous process for manufacture of materials with a constant cross-section. Reinforced fibers are pulled through a resin, possibly followed by a separate preforming system, and into a heated die, where the resin undergoes polymerization. Pultrusion is not limited to thermosetting polymers or polyimides. More recently, pultrusion has been successfully used with thermoplastic matrices such either by powder impregnation of fibers or by surrounding it with sheet material of a thermoplastic/polymide matrix, which is then heated.

In one embodiment, the base portion 14 and/or removable base portion 28 and/or plural movable tabs 22 are produced with an overwrapping transverse winding process that combines continuous filament winding with a pultrusion manufacturing process to produce a pultruded pullwound structure.

The "pullwinding" process incorporates plural longitudinal reinforcement firers with plural helical-wound (e.g., hoop, etc.) layers, providing maximum torsional properties and hoop strength. A self-contained inline winding unit is used with a pultrusion machine for feeding angled fibers between layers of unidirectional fibers before curing in a pultrusion die. The plural longitudinal re-enforcement fibers are used for axial and bending resistance while the plural helical-wound fibers are used for hoop tension and compression resistance. The pullwinding equipment is comprised of twin winding heads which revolve in opposite directions over a spindle. However, the present invention is not limited to such an embodiment and other embodiments can also be used to practice the invention.

However, the present invention is not limited to these materials and other materials and techniques can be used to practice the invention.

Figure 2:
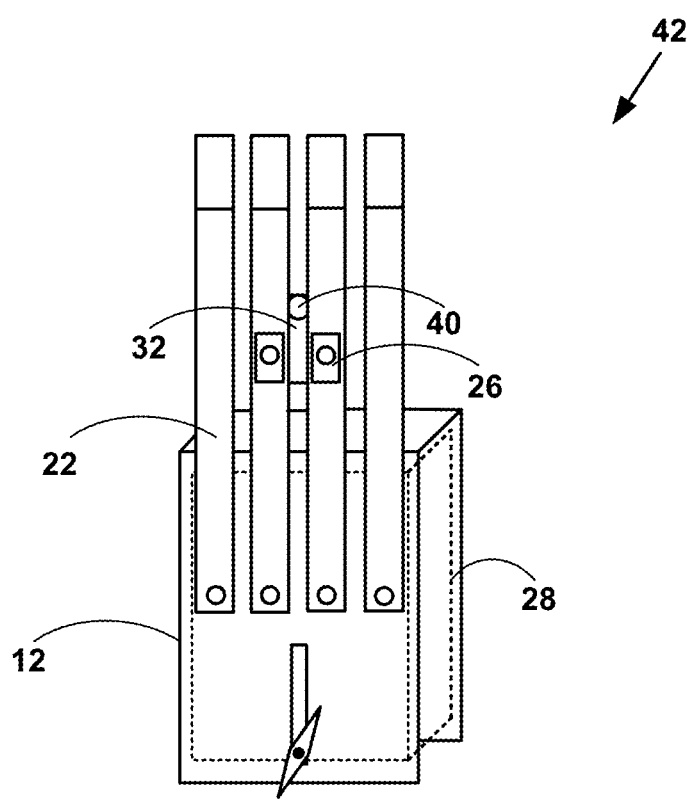
FIG. 2 is a block diagram illustrating another front view of the exemplary hair cutting practice apparatus of FIG. 1.

FIG. 2 is a block diagram 42 illustrating another front view of the exemplary hair cutting practice apparatus 12 of FIG. 1 (not drawn to scale).

In FIG. 2, the plural movable tabs 22 are in a contracted and/or closed position. The mannequin head mounting component 32 is bent over with the angular movable component 36 and placed inside the plural movable tabs 22, 22' for easy transport and storage of the apparatus 12 with only a top portion of mannequin tab component 40 visible. The removable base portion 28 is illustrated inside the apparatus 12 with a dashed line.

FIG. 3 is a block diagram 44 illustrating a side view of the exemplary hair cutting apparatus of FIGS. 1 and 2 (not drawn to scale).

The apparatus 12 in FIG. 3 is in the contracted and/or closed position. A back surface 46 of base portion 14 is visible in FIG. 3 and includes a second visible pressure screws 16'. FIG. 3 also illustrates an additional pressure component 48 on a back side 50 of the front body surface 20 of the base portion 14. In a preferred embodiment, the additional pressure component 48 is a protruding component that protrudes from the back side 50 of the front body surface 20 to provide an additional pressure and gripping surface on a chair to which the apparatus is attached. However, the present invention is not limited to this embodiment and the invention can be practiced with or without the additional pressure component 48.

In FIG. 3, the plural movable tabs 22 are in a contracted and/or closed position. The mannequin head mounting component 32 is bent over with the angular movable component 36 and placed inside the plural movable tabs 22 and the removable base portion 28 is also inside the base portion 14 for easy transport and storage of the apparatus 12. The apparatus 12 is specifically sized and shaped to fit inside a student's backpack (e.g., 76 FIG. 8, etc.) for easy transport to and from a classroom.

Figure 4:
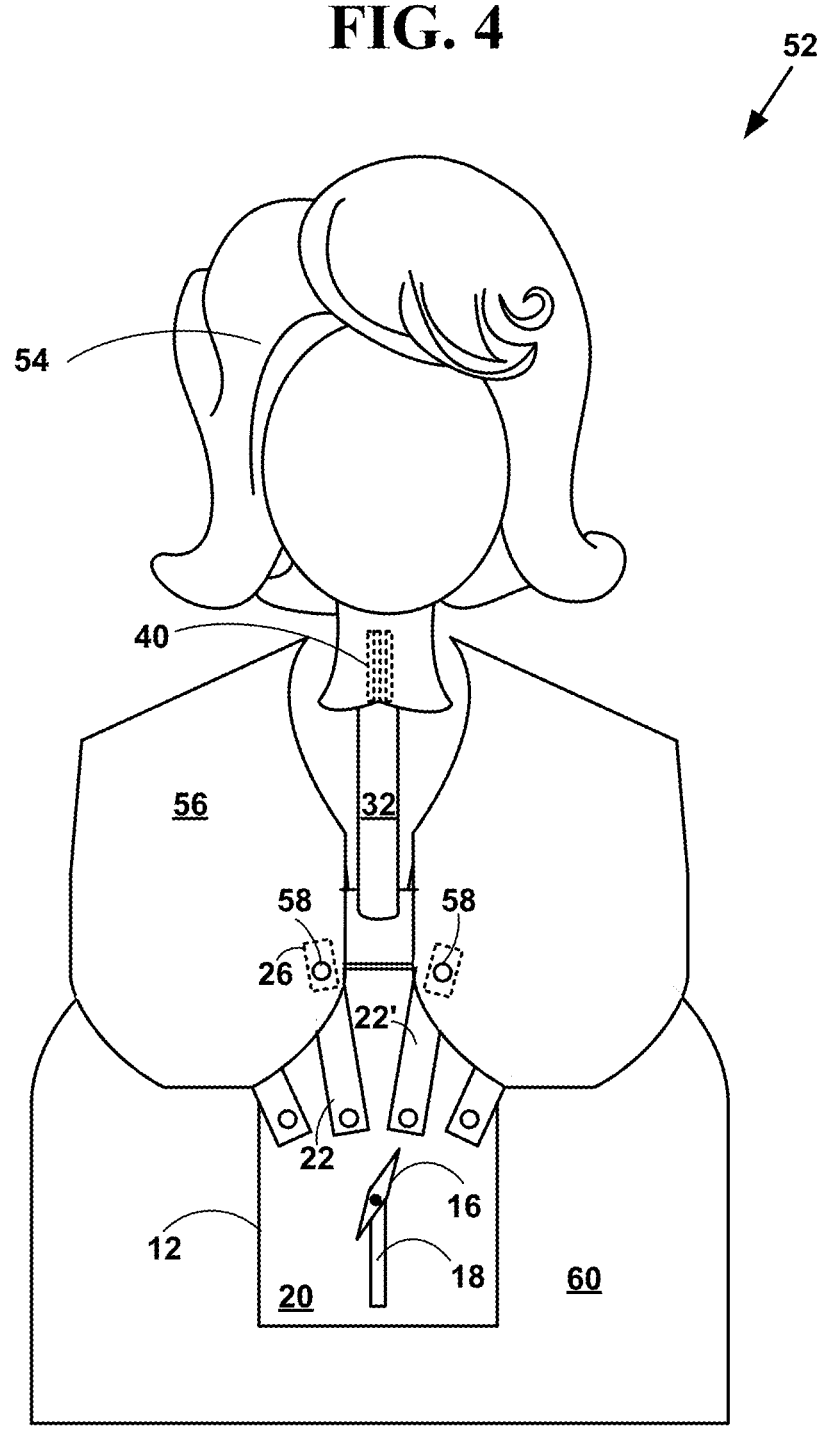
FIG. 4 is a block diagram illustrating another front view of the exemplary hair cutting practice apparatus of FIG. 1 with a cutting cloth partially open.

FIG. 4 is a block diagram 52 illustrating another front view of the exemplary hair cutting practice apparatus 12 of FIG. 1 with a cutting cloth 56 partially open (not drawn to scale).

Figure 5:
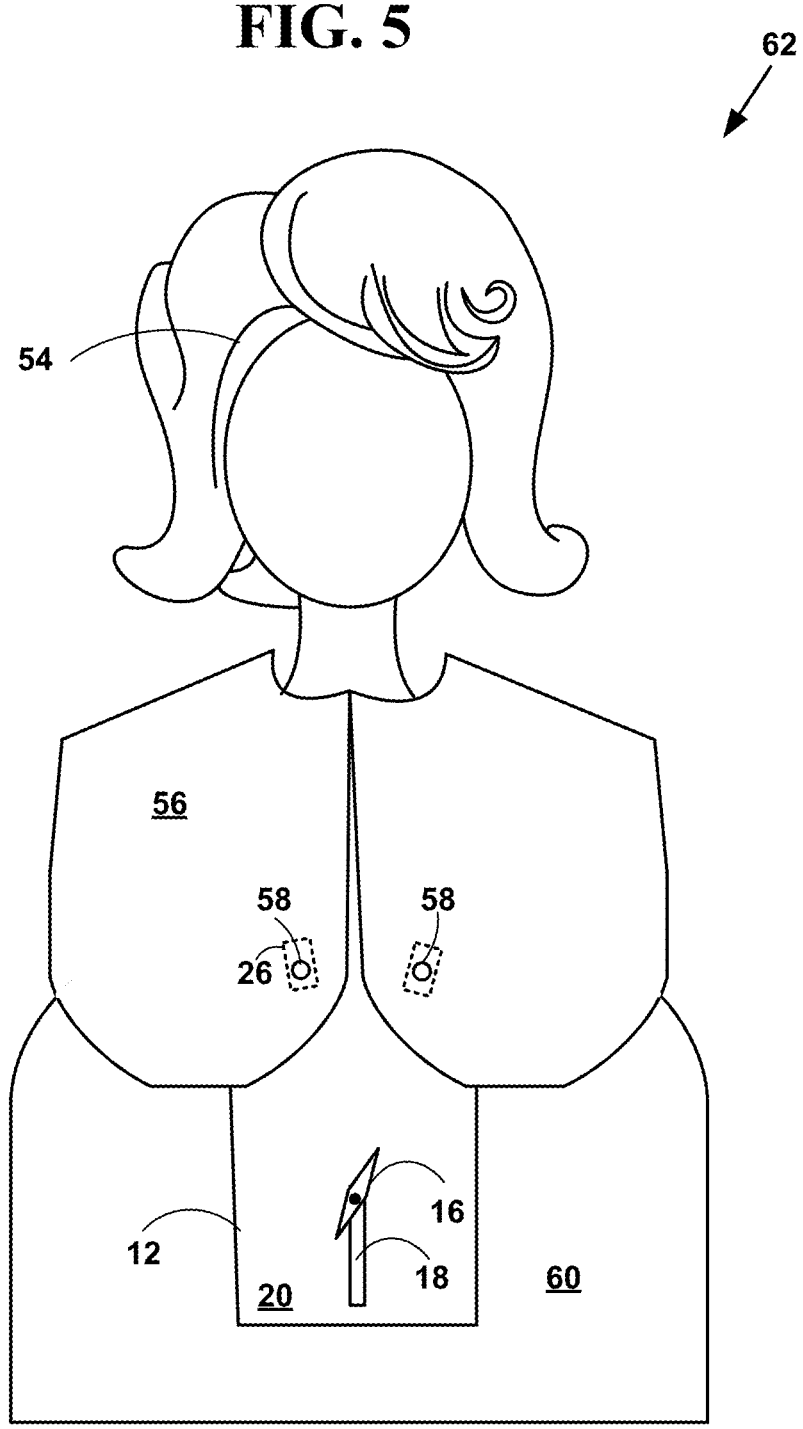
FIG. 5 is a block diagram illustrating another front view of the exemplary hair cutting practice apparatus of FIG. 1 with a cutting cloth closed.

The apparatus 12 includes a female mannequin head 54 attached to mannequin tab component 40 (not visible) on the mannequin head mounting component 32. The apparatus 12 further includes a cutting cloth 56 placed over the plural movable tabs 22 in the expanded and/or open position thereby simulating shoulders of an average human subject. The cutting cloth 56 is partially open in FIG. 4 to illustrate its placement over the plural movable tabs 22 of the apparatus 12. In most embodiments, the cutting cloth 46 completely covers all of the movable tabs 22 as is illustrated in FIG. 5.

The cutting cloth 56 further includes one or more second magnets 58 that align with the one or more first magnets 26 on the selected ones of the plural movable tabs, 22, 22'. Since the set of first and second magnets align over the top of each other only the cutting cloth 56 magnets 58 are illustrated and visible in FIG. 4. The apparatus 12 is attached to exemplary back portion 60 of a standard barber shop and/or beauty shop and/or saloon hair cutting chair. Such chairs are a standard specific height, size and shape and allow a student to practice cutting hair in a very accurate environment that simulates cutting hair on the actual human subject that would actually be sitting in the chair. However, the present invention is not limited to attaching the apparatus 12 standard hair cutting stairs.

In a preferred embodiment, the cutting cloth 56 includes a vinyl, plastic, rubber, cloth with natural fibers (e.g., wool, cotton, etc.) and/or artificial fibers (e.g., rayon, polyester, etc.) and/or other material.

In another preferred embodiment, the cutting cloth 56 is replaced with a t-shirt, sweat-shirt, blouse, dress shirt, and/or other upper body clothing item. In such an embodiment, these clothing items may include a name of a school, advertising, etc. and may include one of a plurality of different colors to enhance a student's learning experience.

The apparatus 12 is attached to the chair back portion 60 with pressure screw 16. In FIG. 4, the apparatus 12 is attached without use of removable base portion 28 because most barber and/or beauty shop chairs include a hard back portion (e.g., wood, metal, plastic, etc.) below a foam-based and/or other compressible portion that allows the base portion 20 to be compressed and tightened around a front and back of the chair back portion 50 with pressure screws 16, 16' and held firmly in place for use.

FIG. 5 is a block diagram 62 illustrating another front view of the exemplary hair cutting practice apparatus 12 of FIG. 1 with the cutting cloth 56 closed (not drawn to scale).

The cutting cloth 56 covers all of the plural movable tabs, 22 and is held firmly in place with magnets 26, 58. However, the present invention can also be used without any magnets and can be used by simply draping the cutting cloth 56 over the plural movable tabs 22.

Figure 6:
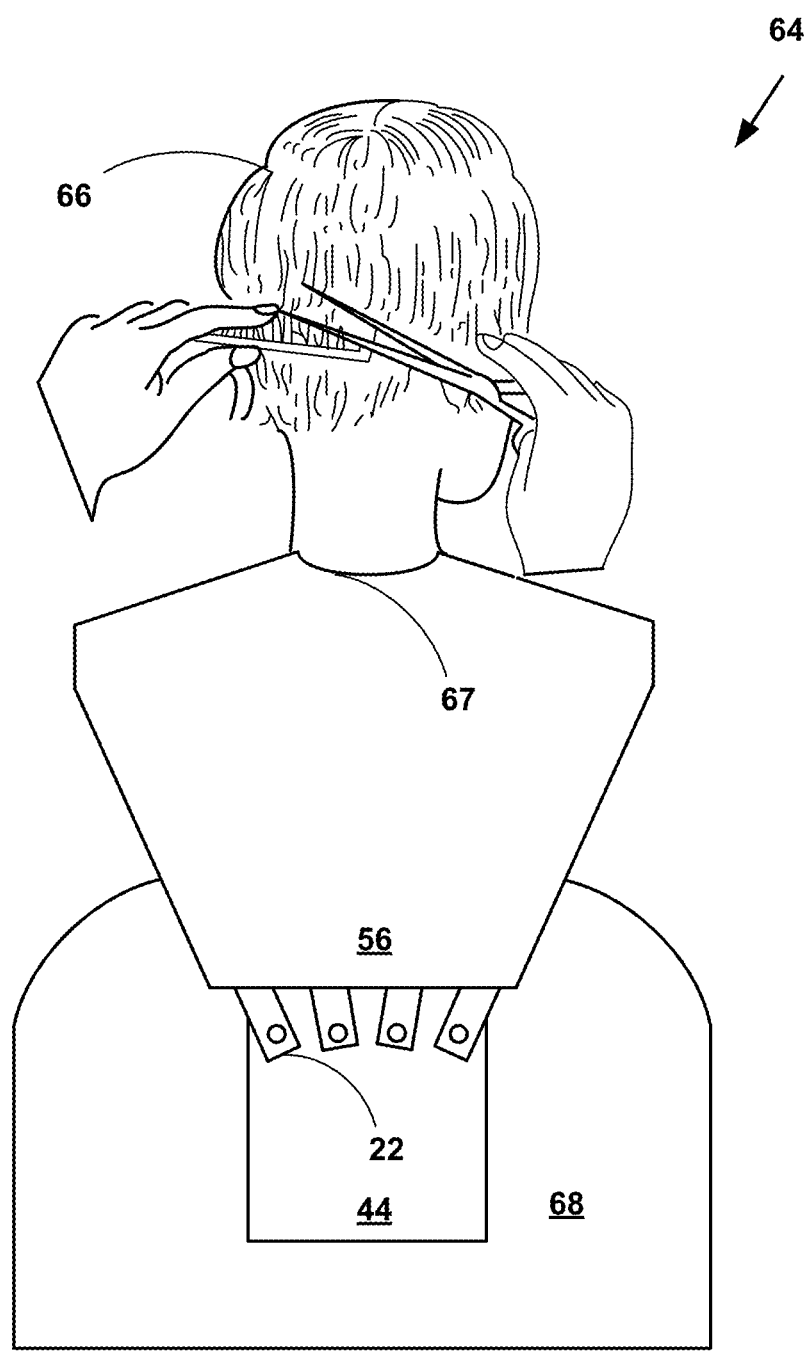
FIG. 6 is a block diagram illustrating another back view of the exemplary hair cutting practice apparatus of FIG. 5.

FIG. 6 is a block diagram illustrating a back view 64 of the exemplary hair cutting practice apparatus 12 of FIG. 5 now illustrated with a male mannequin head 66 (not drawn to scale).

A back portion 68 of the chair 60 is visible. In FIG. 6, the cutting cloth 56 as does not cover all of the plural movable tabs 22 in FIG. 6 to further illustrate aspects of the invention. However, in a preferred embodiment, the cutting cloth 56 covers all of the plural movable tabs 22 on the front side and the back side 68 of the chair.

As FIG. 6 illustrates the plural movable tabs 22 and the cutting cloth 56 also provide an accurate back neck and shoulder line 67 for a simulated human subject to practice hair cutting.

Figure 7:
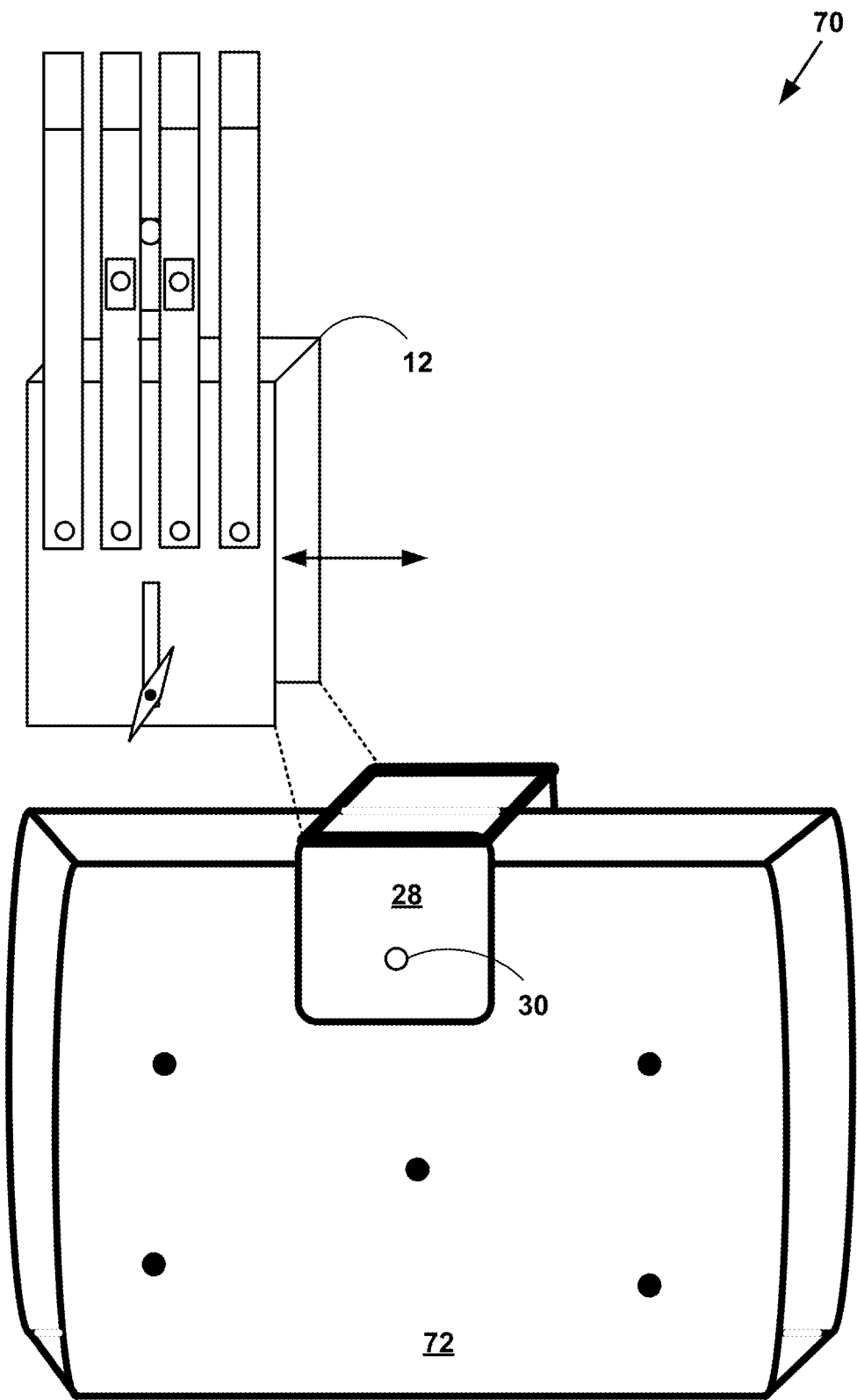
FIG. 7 is a block diagram illustrating a front view of the exemplary hair cutting practice apparatus of FIG. 1 with a removable base portion attached to a chair back.

FIG. 7 is a block diagram illustrating a front view 70 of the exemplary hair cutting apparatus 12 of FIG. 1 with the removable base portion 28 attached to a chair back 72 (not drawn to scale).

The chair back 72 is not a standard size barber, beauty and/or salon chair. The apparatus 12 is in the contracted and/or closed position in FIG. 7. The apparatus 12 slides on and engages and/or off and disengages the removable base portion 28 which is attached to the chair back 72. In FIG. 7 the removable base portion 28 allows the apparatus 12 to be attached to virtually any chair (or stationary object such as wall table, etc.) of any size and/or shape. The removable base portion 28 allows a hair cutting student to use apparatus 12 on chairs 72 at a home location that are not the same standard size and shape as a barber chair in a barbers office or a beauty shop chair in a beauty shop and/or salon.

Figure 8:
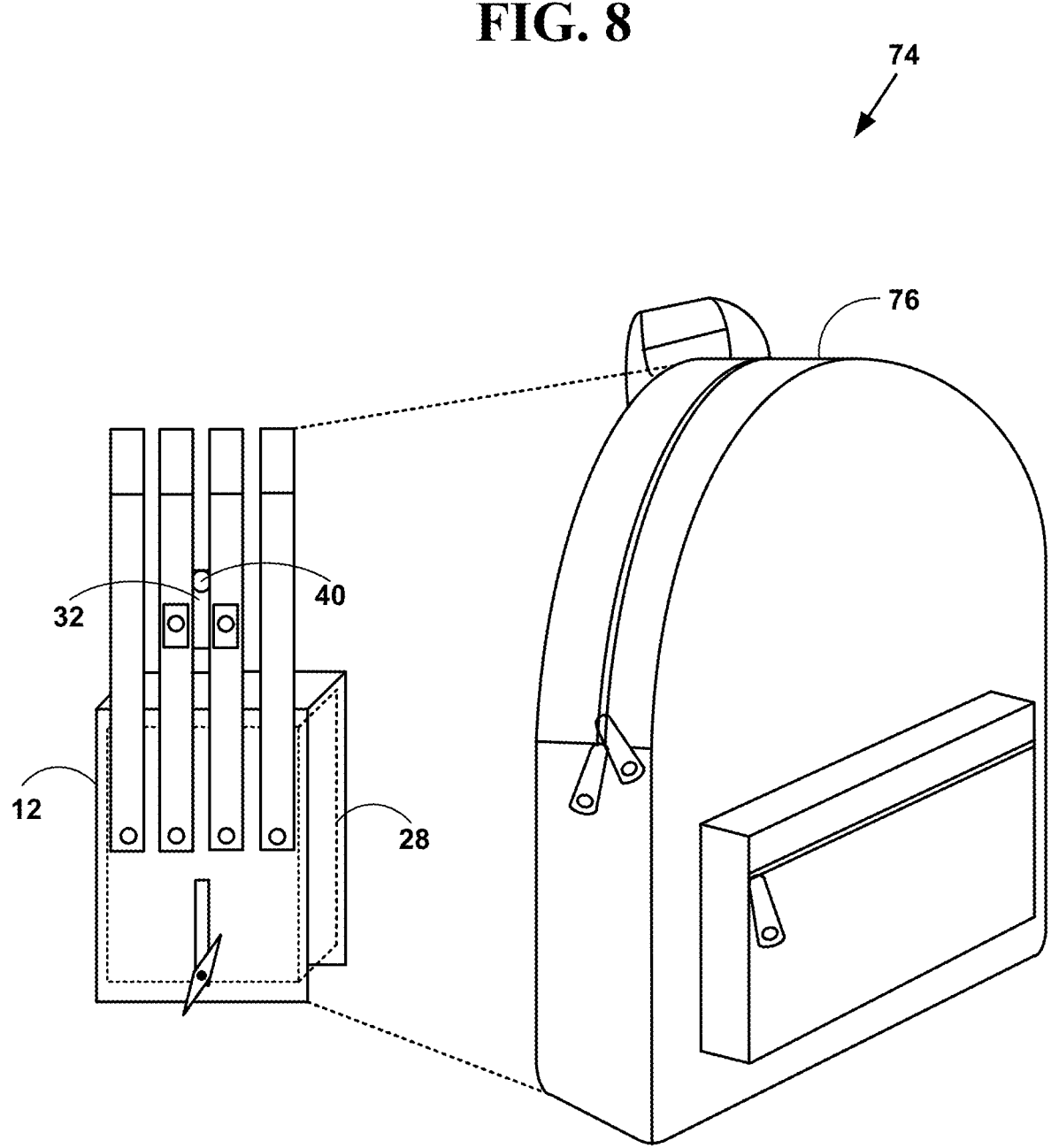
FIG. 8 is a block diagram illustrating a the exemplary hair cutting practice apparatus of FIG. 1 with a backpack.

FIG. 8 is a block diagram 74 illustrating the exemplary hair cutting apparatus 12 of FIG. 1 with a student backpack 76.

The apparatus 12 is in the contracted and/or closed position. The apparatus 12 is specifically sized and shaped to fit inside a student's backpack 76 for easy transport to and from a classroom.

For example, in one preferred embodiment, the student backpack 76 has a height of about 15 inches a width of about 13 includes and a depth of about 10 inches. However, the present invention is not limited to such an embodiment and other measurements for the student backpack 76 can be used to practice the invention.

Figure 9:
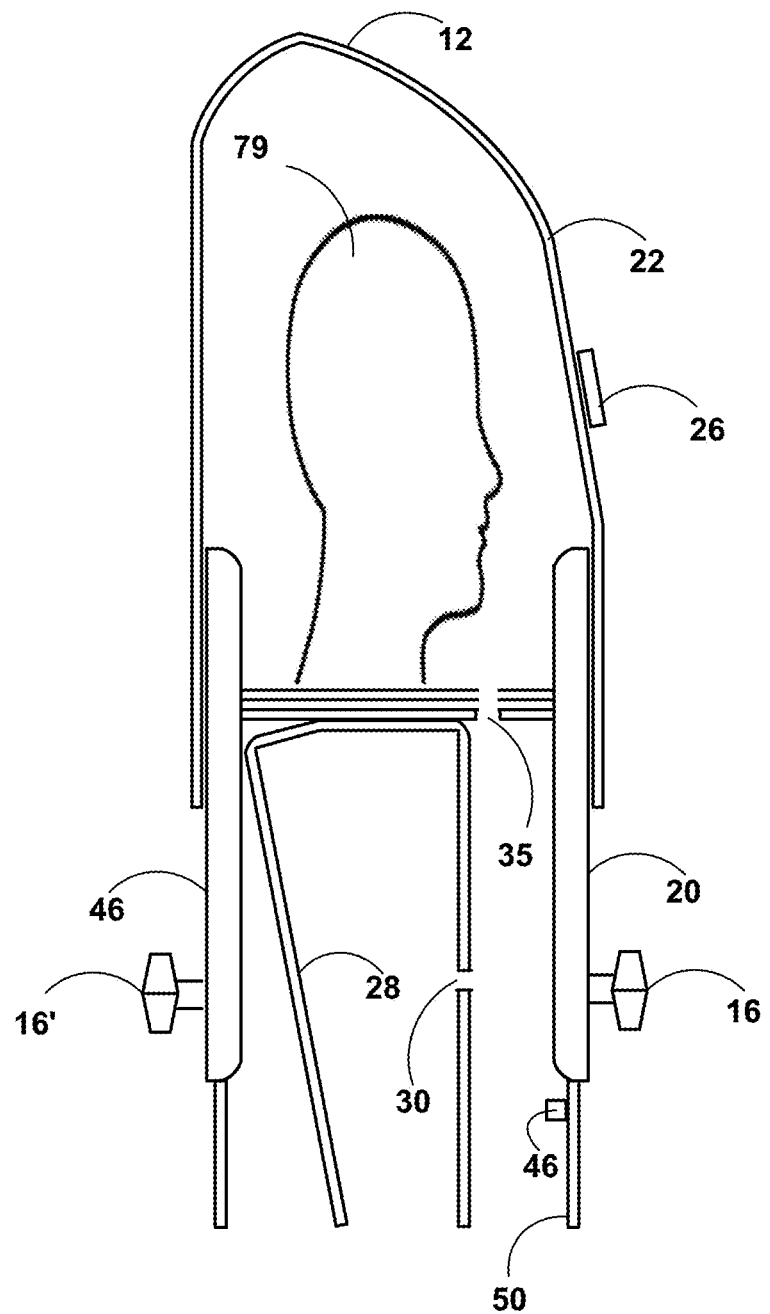
FIG. 9 is a block diagram illustrating another side view of the exemplary hair cutting practice apparatus of FIG. 1. with mannequin head.

FIG. 9 is a block diagram 77 illustrating another side view of the exemplary hair cutting apparatus 12 of FIG. 1 with an exemplary mannequin head 79 (not drawn to scale).

The mannequin head 79 obscures the view of on mannequin head mounting component 32 in FIG. 9 (not drawn to scale).

In another preferred embodiment, the apparatus 12 in the contracted and/or closed position is specifically sized and shaped to include enough space to also store mannequin head 54, 66, 79 within the apparatus 12 for easy transport for the student. This embodiment allows the student to place the apparatus 12 with the mannequin head 79 stored inside the student backpack for easy transport to and from classes.

In such an embodiment, the plural movable tabs 22 are longer and comprise an additional back portion as a result of the longer length tabs 22 of a simulated human subject in addition to a shoulder portion. The mannequin head 54, 66, 79 may be placed on mannequin head mounting component 32 within the apparatus 12 and/or next to mannequin head mounting component 32 (illustrated in FIG. 9) within the apparatus 12. However, the present invention is not limited to such an embodiment and the invention can be practiced without storing the mannequin head 54, 66, 79 within the apparatus 12.

In a preferred embodiment as illustrated in FIG. 9, the longer the plural movable tabs 22 include plural movable tabs 22 of about 24 to 36 inches in length. However, the present invention is not limited to such measurements and other measurement can be used to practice the invention.

Figure 10:
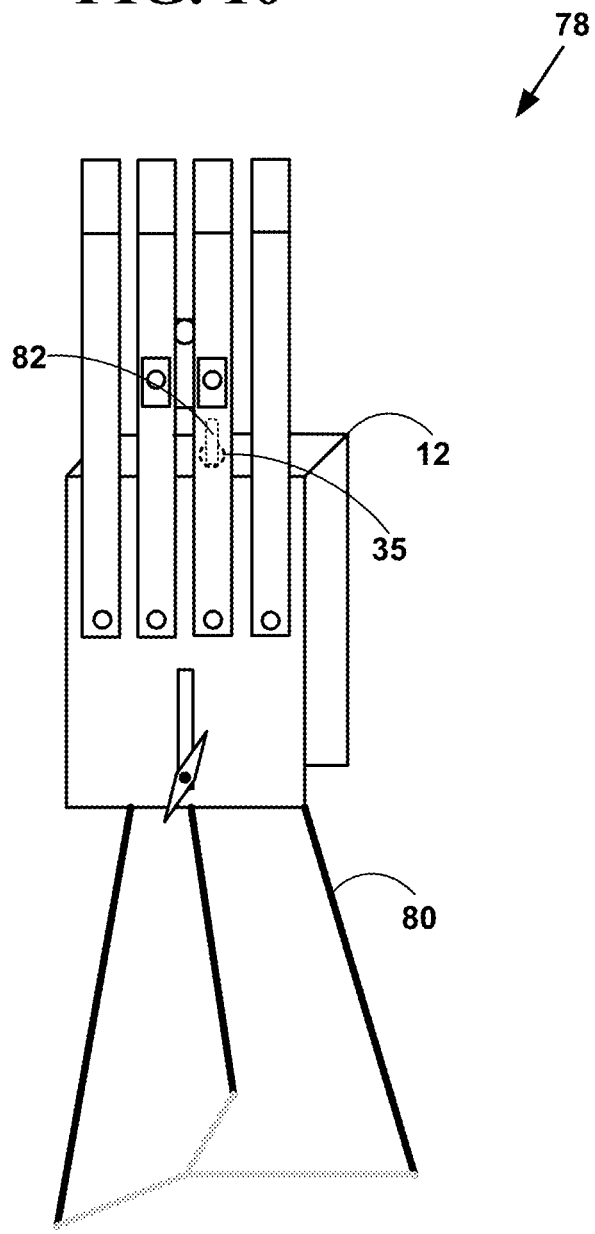
FIG. 10 is a block diagram illustrating the exemplary hair cutting practice apparatus of FIG. 1 on a tripod.

FIG. 10 is a block diagram 78 illustrating the exemplary hair cutting apparatus 12 of FIG. 1 on a free standing stand such as a tripod 80 (not drawn to scale).

The tripod 80 is connected to the apparatus 12 with another connection means 82 (e.g., bolt, pin, screw, pressure screw, etc.) via the base connection component 35 both of which are illustrated with dashed lines in FIG. 9 as they are obscured by plural movable tabs 22. Attaching apparatus 12 to a tripod 80 allow a student to practice cutting hair without any chairs at all. FIG. 10 is a block diagram illustrating the exemplary hair cutting apparatus 12 of FIG. 5 on a tripod 80 (not drawn to scale). Removable base portion 28 is not used or illustrated in FIG. 10.

Figure 11:
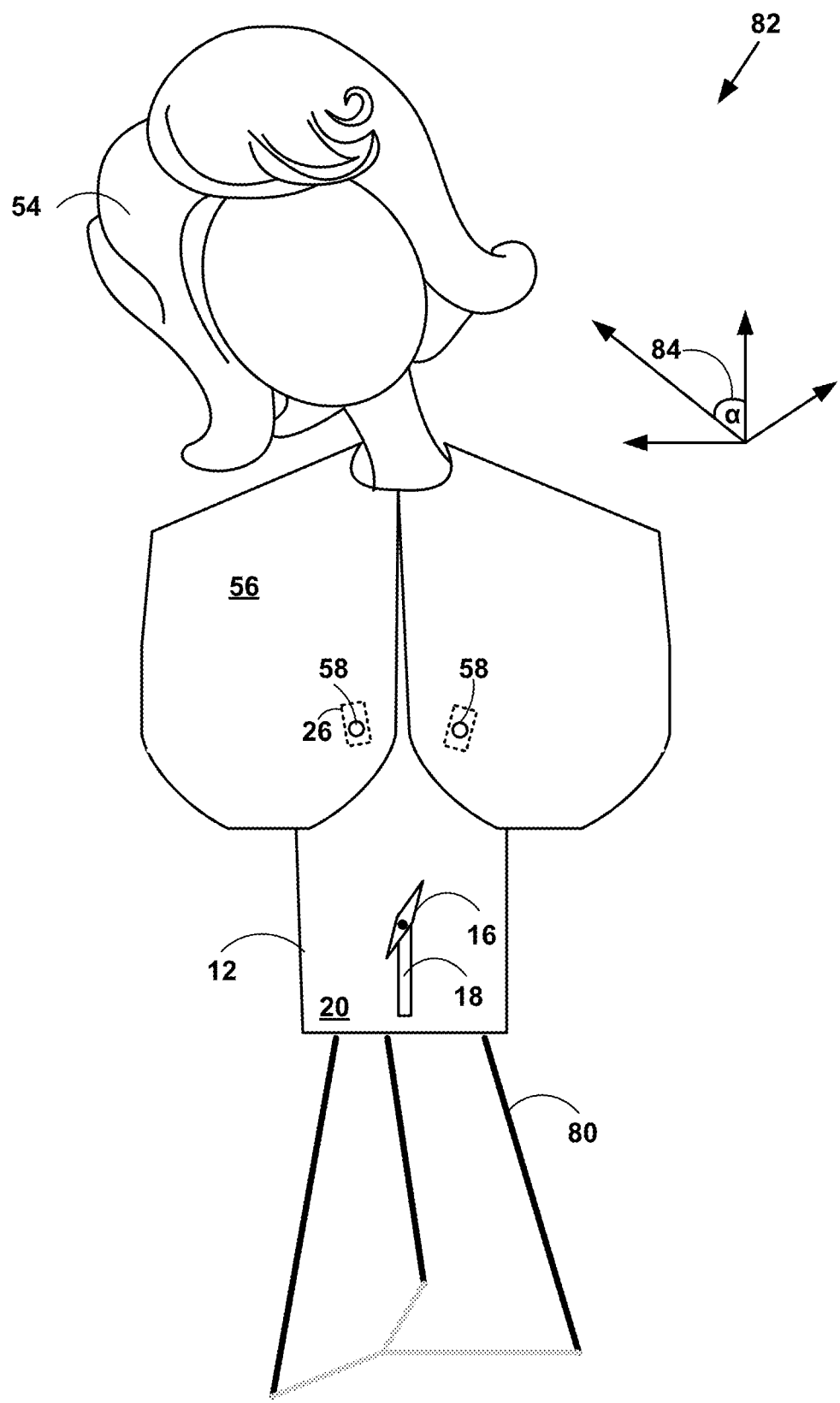
FIG. 11 is a block diagram illustrating the exemplary hair cutting apparatus of FIG. 5 on a tripod.

FIG. 11 also illustrates the exemplary hair cutting practice apparatus 12 of FIG. 1 with the cutting cloth 56 closed. (Not drawn to scale).

Removable base portion 28 is not used or illustrated in FIG. 11. Attaching apparatus 12 to a tripod 80 allow a student to practice cutting hair without any chairs at all. FIG. 11 also illustrates the human mannequin head 54 tipped at angle alpha ($\alpha$) 84 with the angular movable component 36 of the mannequin head mounting component 32 for practice hair cutting with the human mannequin head 54 tipped at different angles.

FIG. 12 is a block diagram 86 illustrating other various other movement angles 88 of the angular movement component 36 of the apparatus 12 (not drawn to scale).

FIG. 13 is a block diagram illustrating a front view 90 of the exemplary hair cutting practice apparatus 12 of FIG. 1 with another exemplary removable base portion 28' attached to a chair back 72. In FIG. 13 the another removable base portion 28' further includes a receiving track 92 for attaching the apparatus 12 to a free standing stand (e.g., tripod 80, etc.) and/or free standing leg 81', 81". The another removable base portion 28' of FIG. 13 with the receiving track 92 make the apparatus further adaptable to virtually any chair of virtually any size, shape, dimension.

Figure 14:
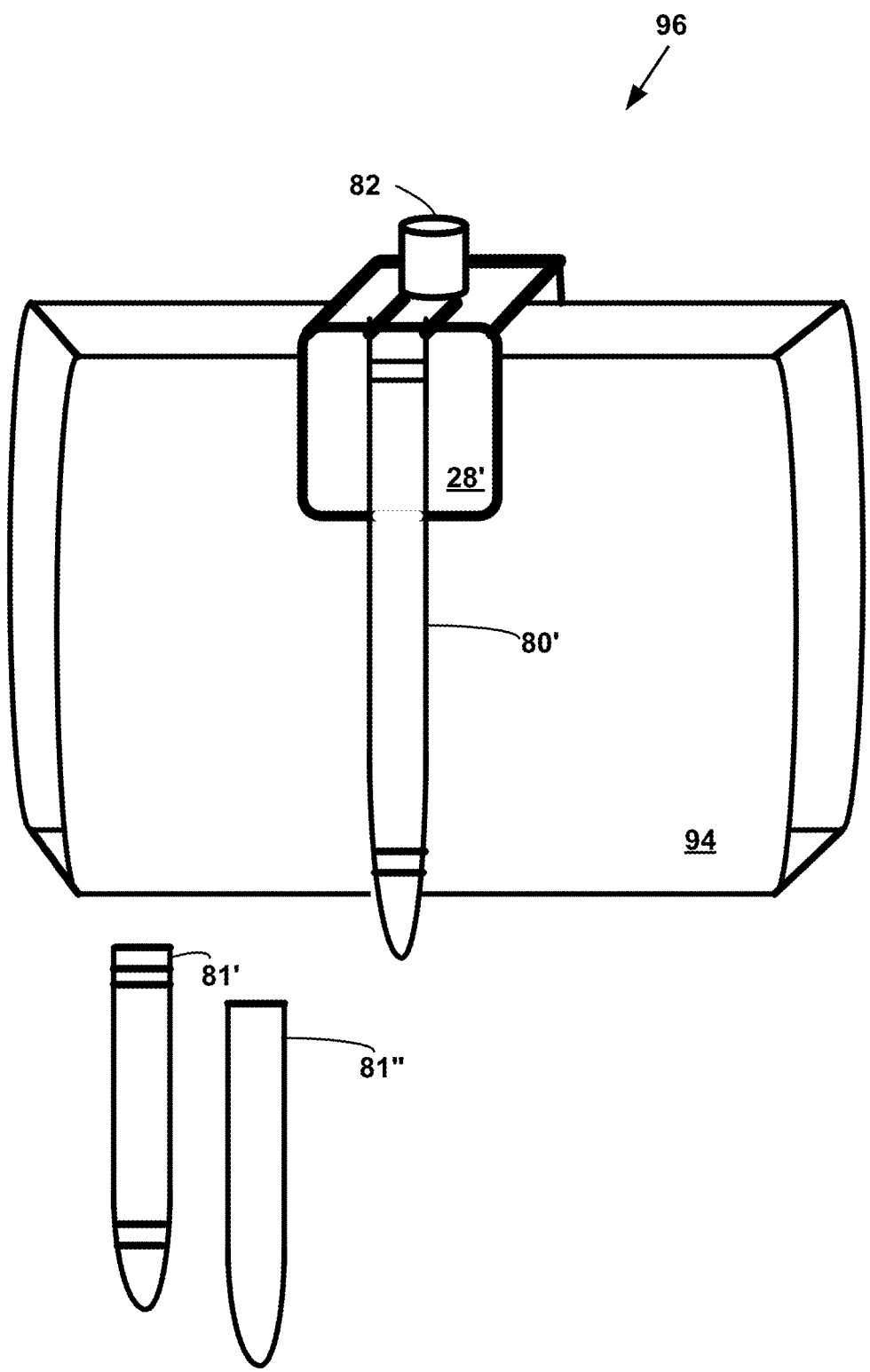
FIG. 14 is a block diagram illustrating a front view of the another exemplary removable base portion attached to a chair back and including a portion of a free standing stand.

FIG. 14 is a block diagram 96 illustrating a front view of the exemplary hair cutting practice apparatus 12 of FIG. 1 with the another exemplary removable base portion 28' attached to a chair back 94 including a free standing stand 80 including a tripod 80. The legs 80' of the free standing stand 80 provide additional support for the exemplary hair cutting practice apparatus 12 of FIG. 1 and allows use on virtually any type of chair a hair cutting student may have.

In FIG. 14, exemplary removable base portion 28' is used to attach the tripod 80. One leg 80' of tripod 80 is visible in FIG. 14. Apparatus 12 is connected to tripod 80 via base connection component 35 of apparatus 12. Tripod 80 has a tripod connection component 82 (not drawn to scale) which is part of tripod 80 which is used to engage a camera, mannequin head 54, 66, 79, etc. Connection component 82 of the tripod 80 is placed through 80 via base connection component 35 of apparatus 12 to connect the apparatus 12 to the tripod and to the chair back 94 via the removable base portion 28'.

In another embodiment, tripod 80 is replaced with a single telescoping free standing leg 81. In another embodiment, the tripod is a replaced with a solid free standing leg 81" that does not include and telescopic components. Such free standing legs, 81', 81" provide additional stability for the apparatus 12 when connected to a chair or other surface. However, the present invention is not limited to such embodiments and other free standing stands and/or other embodiments can be used to practice the invention.

Figure 15:
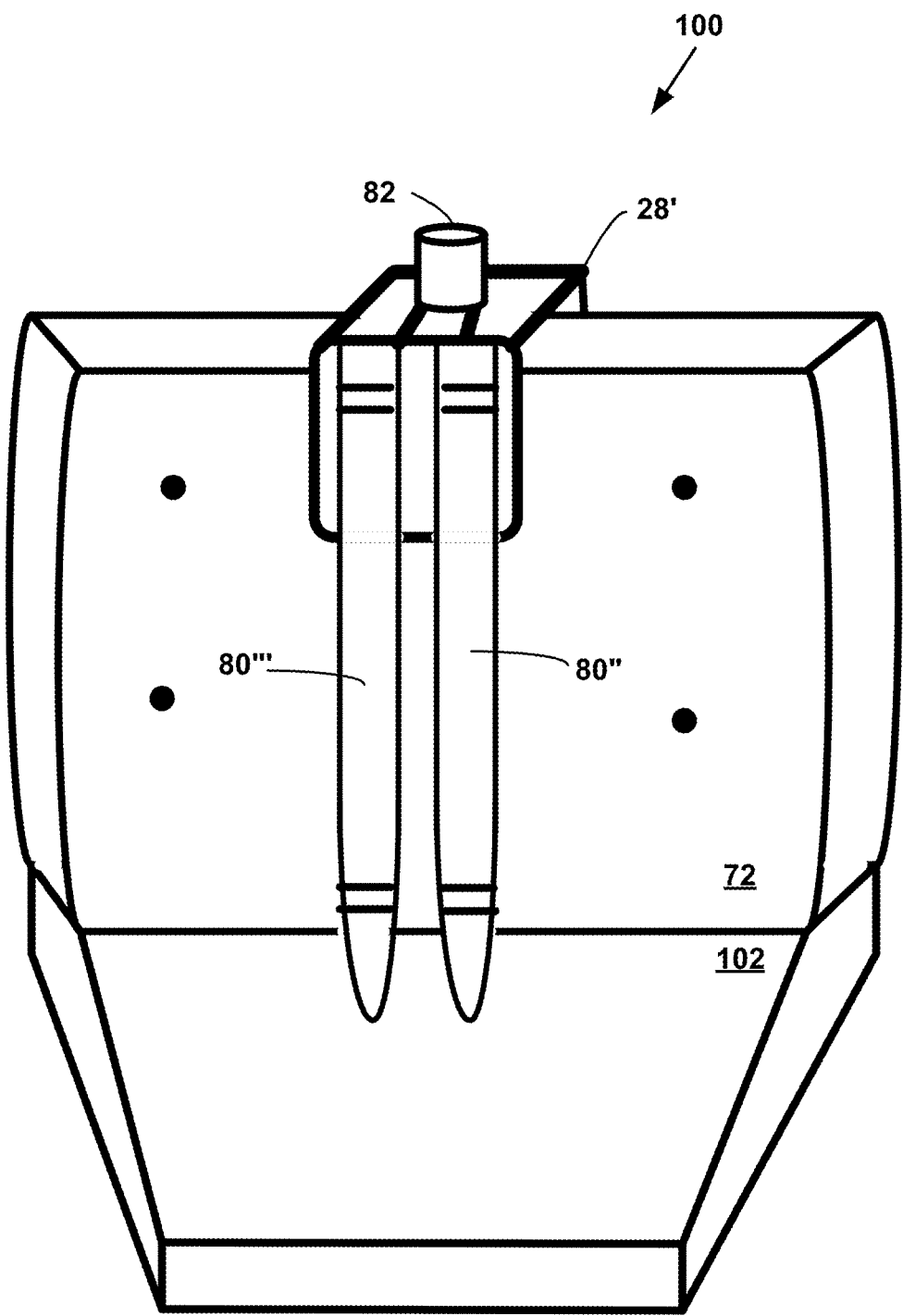
FIG. 15 is a block diagram illustrating a front view of the another exemplary removable base portion attached to a chair front and including another portion of free standing stand.

FIG. 15 is a block diagram 100 illustrating a front view of the another exemplary removable base portion 28' attached to a chair front 72 and including a chair sitting portion 102 and a free standing stand 80 including the tripod 80.

In FIG. 15 the free standing stand includes the two remaining legs 80" and 80"' of tripod 80. The first leg 80 was illustrated in FIG. 14. As is illustrated in FIG. 15, the tripod 80 or other free standing stand provides additional flexibility that allows apparatus 12 to be used on virtually any chair, couch, hard surface that a hair cutting student may have.

In another embodiment, the removable base portion 28' allows also allows the tripod 80 to be used without apparatus 12 by connecting mannequin head (e.g., 54, 66, 79, etc.) directly to a tripod 80 via a tripod connection component 82 which is and/or is not specifically sized and shape to attach mannequin head (e.g., 54, FIG. 4, 66, FIG. 6, 79, FIG. 9, etc.). In such an embodiment, a standard camera tripod or a specialty tripod can be used to practice hair cutting. However, the present invention is not limited to such embodiments and other embodiments can be used to practice the invention.

In another embodiment, tripod 80 is replaced with a telescoping free standing leg 81. In another embodiment, the tripod is a replaced with a solid free standing leg 81" that does not include and telescopic components. However, the present invention is not limited to such embodiments and other free standing stands and/or other embodiments can be used to practice the invention.

The present invention includes an exemplary hair cutting practice apparatus. The apparatus in its expanded configuration allows a human mannequin head to be attached and simulates a size and shape of a shoulder portion and/or should and/or a back portion of an actual human subject. The apparatus in its contracted position is easily transportable in a student backpack. The apparatus is attachable to and removable from a variety of chairs, tables, walls and other free-standing objects such as tripods. The apparatus is used for hair cutting students who desire to practice hair cutting skills inside and outside a classroom.

It should be understood that the architecture, processes, methods apparatus and devices described herein are not related or limited to any particular type of materials or design unless indicated otherwise. Various types of materials and designs may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams that describe any devices.

While various elements of the preferred embodiments have been specifically described as being implemented in specific designs and materials, in other embodiments other designs and materials may alternatively be used, and vice-versa.

The claims should not be read as limited to the described order or elements unless stated to that effect. In addition, use of the term "means" in any claim is intended to invoke 35 U.S.C. § 112, paragraph 6, and any claim without the word "means" is not so intended.

Therefore, all embodiments that come within the scope and spirit of the following claims and equivalents thereto are claimed as the invention.

I claim:

1. A hair cutting practice apparatus, comprising in combination:
   a rigid base portion;
   one or more adjustable component tracks in a front and a back surface of the rigid base portion with one or more pressure screws for applying pressure to the front and the back surface of the rigid base portion to securely attach the rigid base portion to a standard hair cutting chair;
   a base connection component in a top surface of the rigid base component to attach the rigid base component to a freestanding object;
   a plurality of inverted u-shaped moveable tabs attached to the rigid base portion with an attachment means, the plurality of inverted u-shaped moveable tabs moveable towards and away from each other on the rigid base portion by pivoting at the attachment means into an expanded or contracted configuration, the expanded configuration simulating a plurality of different sizes and shapes of a shoulder portion of an actual human subject, the plurality of inverted u-shaped moveable tabs also adjustable by expanding or compressing to also simulate a plurality of different widths of the shoulder portion of the actual human subject, the expanded configuration including the plurality of inverted u-shaped moveable tabs physically separated from each other with one or more first distances providing a skeleton structure for the shoulder portion and the contracted configuration of the plurality of inverted u-shaped moveable tabs physically separated from each other with a second distance providing a support structure with an internal storage space within the plurality of inverted u-shaped moveable tabs for storing other components of the hair cutting practice apparatus and providing a minimal size configuration of the hair cutting practice apparatus for easy storage and transport of the hair cutting practice apparatus, wherein the first distance is larger than the second distance;
   a mannequin head mounting component attached to a top surface of the rigid base portion including an angular moveable component with an adjustment screw, the angular moveable component attached to a mannequin tab component for engaging and disengaging and attaching and removing a human mannequin head, the angular moveable component moving the mannequin tab component and the attached human mannequin head to various angles to provide tipping and other movements of the human mannequin head to simulate actual movements of a head of the actual human subject during hair cutting, the angular moveable component held at a desired angle with the adjustment screw;
   a removable base portion specifically sized and shaped to be insertable and removable within the rigid base portion, the removable base portion including a second attachment adjustment component for accepting and engaging one end of the one or more pressure screws used to keep the removable base portion in place, the removable base portion attachable to and removable from other chairs and free-standing objects;
   one or more first magnets attached to selected ones of the plurality of inverted u-shaped moveable tabs for securely attaching a cutting cloth; and
   the cutting cloth with one or more second magnets for securely attaching the cutting cloth to the first magnets on the selected ones of plurality of inverted u-shaped moveable tabs and covering the plurality of inverted u-shaped moveable tabs simulating the shoulder portion of the actual human subject.

2. The hair cutting practice apparatus of claim 1 wherein the plurality of inverted u-shaped moveable tabs in the expanded configuration further simulate a size and shape of the shoulder portion and a back portion of the actual human subject.

3. The hair cutting practice apparatus of claim 2 wherein the plurality of inverted u-shaped moveable tabs in a contracted configuration includes enough internal storage space to store the human mannequin head within an interior space of the hair cutting practice apparatus.

4. The hair cutting practice apparatus of claim 1 wherein the rigid base portion, removable base portion and plurality of inverted u-shaped moveable tabs comprise a metal, plastic, rubber, or composite material.

5. The hair cutting practice apparatus of claim 4 wherein the plastic material includes polyetherimide, polyamide, other thermosetting polyimides, polyvinyl chloride (PVC), polyethylene, polypropylene or other plastic materials.

6. The hair cutting practice apparatus of claim 4 wherein the metal material comprises aluminum, steel, stainless steel, iron or copper.

7. The hair cutting practice apparatus of claim 1 wherein the rigid base portion, the removable base portion and the plurality of inverted u-shaped moveable tabs are injection molded, extruded, pultruded or pull-winded.

8. The hair cutting practice apparatus of claim 1 wherein the rigid base portion, the removable base portion and the plurality of inverted u-shaped moveable tabs are produced with an overwrapping transverse winding process that combines continuous filament winding with a pultrusion manufacturing process to produce a pultruded pullwound structure or.

9. The hair cutting practice apparatus of claim 1 wherein the chair includes a barber shop or beauty shop styling chair.

10. The hair cutting practice apparatus of claim 1 wherein the cutting cloth comprises a vinyl, plastic, rubber material or cloth material with natural or artificial fibers.

11. The hair cutting practice apparatus of claim 1 wherein the cutting cloth is replaced with a t-shirt, sweat shirt, dress shirt or blouse.

12. The hair cutting practice apparatus of claim 1 wherein the plurality of inverted u-shaped moveable tabs are replaced with a plurality of hollow tubes.

13. The hair cutting practice apparatus of claim 12 wherein the plurality of tubes include a plurality of hollow rubber, metal, plastic or composite material tubes.

14. The hair cutting practice apparatus of claim 1 wherein the plurality of inverted u-shaped moveable tabs are replaced with a plurality of solid bendable rods.

15. The hair cutting practice apparatus of claim 1 wherein the plurality of inverted u-shaped moveable tabs expand to an end-to-end length of fifteen to twenty one inches.

16. The hair cutting practice apparatus of claim 1 wherein the plurality of inverted u-shaped moveable tabs provide a width up to eleven inches.

17. The hair cutting practice apparatus of claim 1 wherein the plurality of inverted u-shaped moveable tabs include a length of twelve to twenty-four inches to simulate the shoulder portion of the human subject or include a length of twenty-four to thirty-six inches to simulate the shoulder and a back portion of the human subject and includes enough internal space to store the human mannequin head within an interior space of the hair cutting practice apparatus.

18. The hair cutting practice apparatus of claim 1 wherein the free-standing objects include a tripod, other type of chair, couch, table, ledge or wall.

19. The hair cutting practice apparatus of claim 1 wherein the angular moveable component includes a spherical portion movable from an angle of zero to 180 degrees in all directions along a top surface of the spherical portion of the angular moveable component.

20. A hair cutting practice apparatus, comprising in combination:

a rigid base portion;
one or more adjustable component tracks in a front and a back surface of the rigid base portion with one or more pressure screws for applying pressure to the front and the back surface of the rigid base portion to securely attach the rigid base portion to a standard hair cutting chair;
a base connection component in a top surface of the rigid base component to attach the rigid base component to a freestanding object;
a plurality of inverted u-shaped moveable tabs attached to the rigid base portion with an attachment means, the plurality of inverted u-shaped moveable tabs moveable towards and away from each other on the rigid base portion by pivoting at the attachment means into an expanded or contracted configuration, the expanded configuration simulating a plurality of different sizes and shapes of a shoulder portion of an actual human subject, the plurality of inverted u-shaped moveable tabs also adjustable by expanding or compressing to also simulate a plurality of different widths of the shoulder portion of the actual human subject, the expanded configuration including the plurality of inverted u-shaped moveable tabs physically separated from each other with one or more first distances providing a skeleton structure for the shoulder portion and the contracted configuration of the plurality of inverted u-shaped moveable tabs physically separated from each other with a second distance providing a support structure with an internal storage space within the plurality of inverted u-shaped moveable tabs for storing other components of the hair cutting practice apparatus and providing a minimal size configuration of the hair cutting practice apparatus for easy storage and transport of the hair cutting practice apparatus, wherein the first distance is larger than the second distance,
the contracted configuration specifically sized and shaped to fit inside and be transportable inside a backpack, and
the contracted configuration including the internal storage space within the plurality of inverted u-shaped moveable tabs for storing the mannequin head within an interior space of the hair cutting practice apparatus;
a mannequin head mounting component attached to a top surface of the rigid base portion including an angular moveable component with an adjustment screw, the angular moveable component attached to a mannequin tab component for engaging and disengaging and attaching and removing a human mannequin head, the angular moveable component moving the mannequin tab component and the attached human mannequin head to various angles to provide tipping and other movements of the human mannequin head to simulate actual movements of a head of the actual human subject during hair cutting, the angular moveable component held at a desired angle with the adjustment screw;
a removable base portion specifically sized and shaped to be insertable and removable within the rigid base portion, the removable base portion including a second attachment adjustment component for accepting and engaging one end of the one or more pressure screws used to keep the removable base portion in place, the removable base portion including a receiving track for attaching the hair cutting practice apparatus to free standing stands including one or more support legs, the removable base portion attachable to and removable from other chairs, other free-standing objects and the free standing stands;

one or more first magnets attached to selected ones of the plurality of inverted u-shaped moveable tabs for securely attaching a cutting cloth; and the cutting cloth with one or more second magnets for securely attaching the cutting cloth to the first magnets on the selected ones of plurality of inverted u-shaped moveable tabs and covering the plurality of inverted u-shaped moveable tabs simulating the shoulder portion of the actual human subject.

21. The hair cutting practice apparatus of claim 1 wherein the hair cutting practice apparatus in the contracted configuration is specifically sized and shaped to fit inside and be transportable inside a backpack.

\* \* \* \* \*